(12) United States Patent
Shin

(10) Patent No.: US 6,768,583 B2
(45) Date of Patent: Jul. 27, 2004

(54) BINOCULAR DOUBLING AS TOY

(75) Inventor: Ouk-Kyon Shin, 598-3, Shilrim 12-dong, Kwanak-ku, Seoul (KR)

(73) Assignees: Ouk-Kyon Shin, Seoul (KR); Jeong-Woo Lee, Kyungki-do (KR)

( * ) Notice: Subject to any disclaimer, the term of this patent is extended or adjusted under 35 U.S.C. 154(b) by 20 days.

(21) Appl. No.: 10/197,854

(22) Filed: Jul. 19, 2002

(65) Prior Publication Data

US 2003/0016443 A1 Jan. 23, 2003

(30) Foreign Application Priority Data

Jul. 19, 2001 (KR) .......................................... 2001-21800

(51) Int. Cl.[7] .............................................. G02B 23/00
(52) U.S. Cl. ........................ 359/408; 359/409; 359/480; 359/817
(58) Field of Search ................................. 359/407, 408, 359/409, 418, 480–482, 808–811, 815–818; D16/132, 133, 900

(56) References Cited

U.S. PATENT DOCUMENTS 4,913,541 A * 4/1990 Wakayama et al. .......... 359/408
5,825,537 A * 10/1998 Ushiyama ................... 359/408

* cited by examiner

Primary Examiner—Drew A. Dunn
Assistant Examiner—Denise S. Allen
(74) Attorney, Agent, or Firm—Robert E. Bushnell, Esq.

(57) ABSTRACT

Binoculars doubling as a toy, in particular, various spherical shapes such as a soccer ball or baseball. These binoculars have lens barrels ejected from hemispherical bodies to increase the field of vision up over a long distance. The binoculars doubling as a toy may be constructed with hemispherical bodies 1 and 21 defining a complete global shape when coupled with each other, connected to each other by a hinge 15; eye lens barrels 6 and 26 each having eye lenses 5 and 25 and mounted to centers of arc sections 2 and 22 of the bodies 1 and 21; circular plates 7 and 27 mounted into grooves 3 and 23 formed in the arc sections 2 and 22; objective lens barrels 10 and 30 each having objective lenses 9 and 29 and inserted into through holes of the circular plates 7 and 27; and springs 13 and 33 each mounted between the eye lens barrels 6 and 26 and the objective lens barrels 10 and 30.

20 Claims, 4 Drawing Sheets

US 6,768,583 B2

BINOCULAR DOUBLING AS TOY

CLAIM OF PRIORITY

This application makes reference to, incorporates the same herein, and claims all benefits accruing under 35 U.S.C. §119 from my application entitled BINOCULARS FOR A TOY filed with the Korean Industrial Property Office on Jul. 19, 2001 and there duly assigned Serial No. 2001-21800.

BACKGROUND OF THE INVENTION

1. Technical Field

The present invention relates to binoculars doubling as a toy and, more particularly to, binoculars that are constructed with external bodies formed as replicas of various toys having spherical shapes such as soccer balls and baseballs.

2. Related Art

Exemplars of the art such as Korean Laid-Open Utility Model Application No. 1996-46497 entitled Binoculars Doubling as a Toy, suggest that binoculars doubling as a toy can vary the length between objective lenses and eye lenses, and have a global shape when the barrels of the lens are folded together. Such designs for conventional binoculars doubling as a toy however, do not provide springs for automatically extending the barrels for the lenses. Moreover I have noticed that such designs some deficiencies in their fields and construction.

SUMMARY OF THE INVENTION

It is an object of the present invention to provide on improved design for binoculars.

It is another object to provide binoculars doubling as a toy.

It is still another object to provide binoculars that are manufactured to exhibit various spherical shapes such as a soccer ball or baseball.

It is yet another object to provide a design for binoculars that enables the barrels for the lenses to project from hemispherical bodies to prolong the field of vision up to a long distance.

These and other objects may be achieved by constructing binoculars as a replica of a toy. These binoculars may be constructed with hemispherical bodies defining a complete global shape when coupled with each other; the hemispherical bodies are connected to each other by a hinge. Eye lens barrels each having eye lenses are mounted on the centers of arcuate sections of the bodies. Circular plates are mounted in grooves formed in the arcuate sections. The objective lens barrels each have objective lenses and are inserted into through holes of the circular plates. Springs are each mounted between the eye lens barrels and the objective lens barrels. Preferably, fitting projections that are each formed in the objective lens barrels are respectively caught by protrusions that are each formed around the through holes of the circular plates when the objective lens barrels are extended by the springs.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
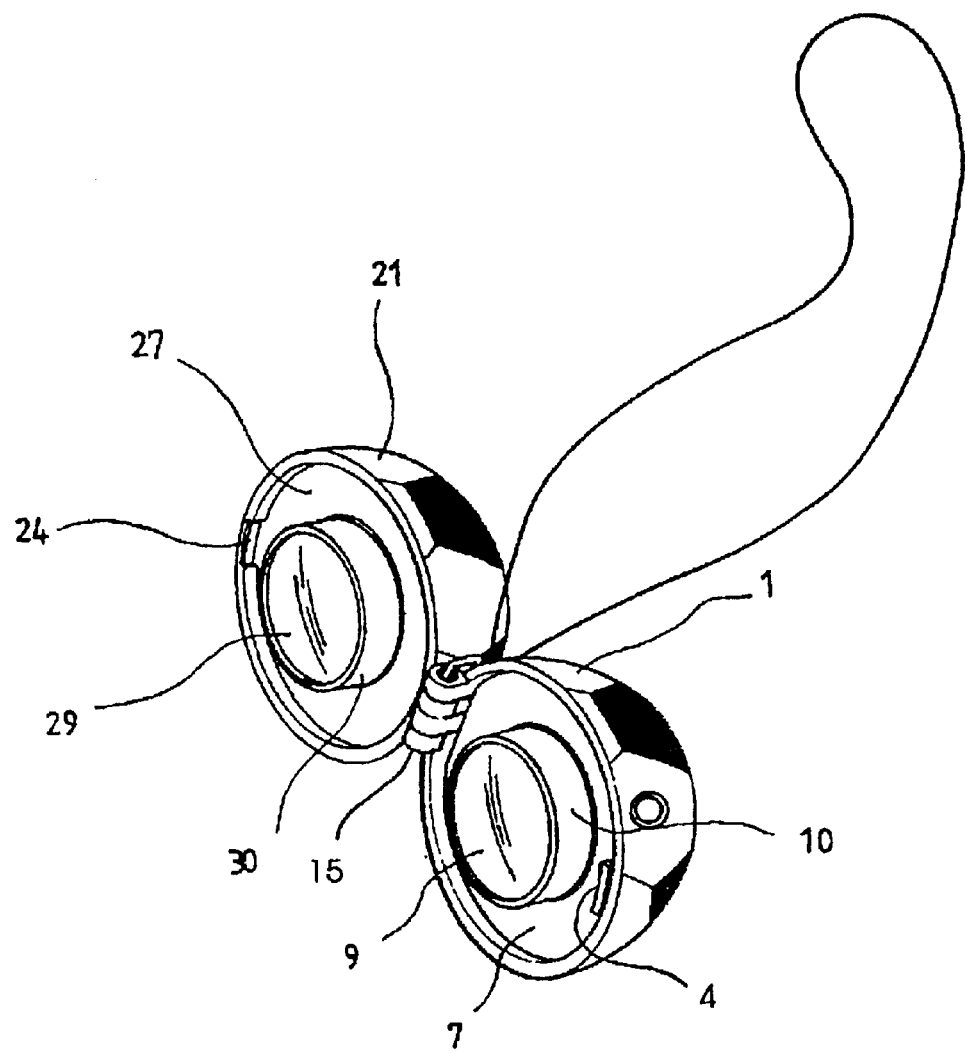
FIG. 1 is a perspective view illustrating of one embodiment of the present invention, with binoculars doubling as a toy.

Turning now to the drawings, one embodiment of the present invention will now be described with reference to the accompanying drawings. In the following description, same drawing reference numerals are used for the same elements even in different drawings. The matters defined in the description such as a detailed construction and elements of a circuit are provided to assist in a comprehensive understanding of the principles of the invention. Thus, it is apparent that the present invention can be implemented without those defined matters. Also, well-known functions or constructions are not described in detail since they would obscure the invention in unnecessary detail.

Figure 2:
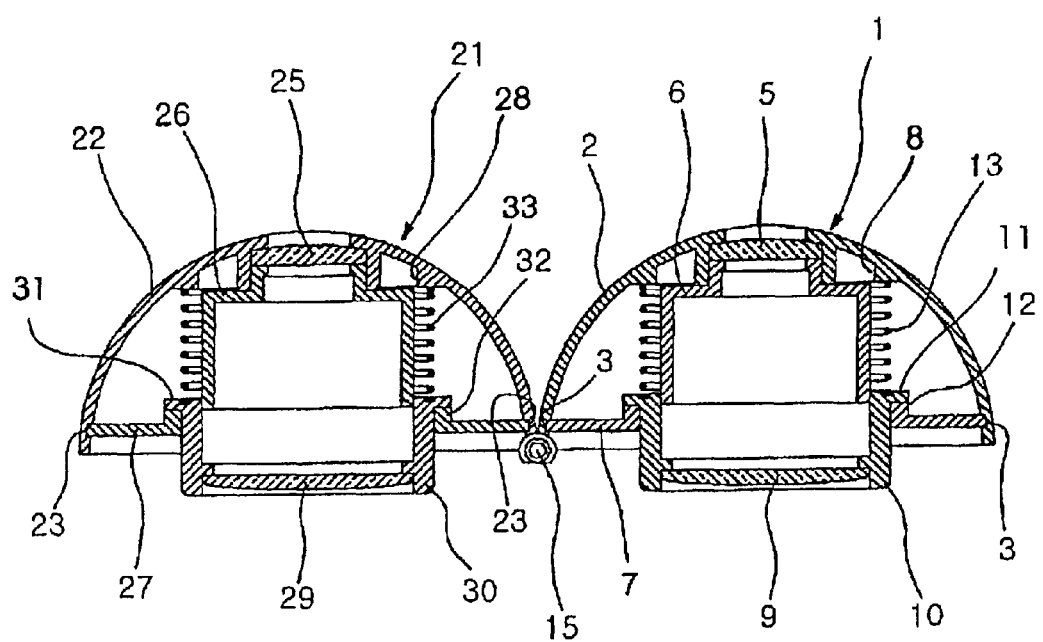
FIG. 2 is a cross sectional view of the binoculars illustrated by FIG. 1.

Referring now to FIGS. 1 and 2, binoculars doubling as a toy may be constructed in accordance with the principles of the present invention with a pair of hemispherical bodies 1, 21 defining a complete global shape when coupled with each other. Bodies 1, 21 may be connected to each other by a hinge 15. Eye lens barrels 6, 26 each mount eye lenses 5, 25 respectively, and are in turn mounted on and supported by corresponding arcuate sections 2, 22 of bodies 1, 21. Circular plates 7, 27 are mounted in grooves 3, 23 formed in arcuate sections 2, 22. Objective lens barrels 10, 30 respectively mount objective lenses 9, 29. Barrels 10, 30 are respectively inserted into through holes of circular plates 7, 27. Springs 13, 33 are each mounted around the exterior circumferential surfaces of eye lens barrels 6, 26 and extend axially along eye lens barrels 6, 26; one end of springs 13, 33 pushes against objective lens barrels 10, 30, while the axially opposite ends of springs 13, 33 pushes against the inside circular flanges formed on the interior hemispherical bodies 1, 21.

Body 1 is provided with a protruding latch 4 and body 21 is provided with a conforming groove 24 so that protruding latch 4 is caught and retentively latched by groove 24 when the bodies 1, 21 are folded together.

When objective lens barrels 10, 30 are ejected by springs 13, 23, fitting projections 11, 31 of the objective lens barrels 10, 30 are respectively caught by flanges 12, 32 formed around through holes formed in circular plates 7, 27. When bodies 1, 21 are folded together, flanges 11, 31 force corresponding ends of springs 13, 33 along the exterior of objective lens barrels 10, 30 toward flanges 8, 28, whereby springs 13 and 23 are compressed within corresponding hemispherical bodies 1, 21.

Figure 3:
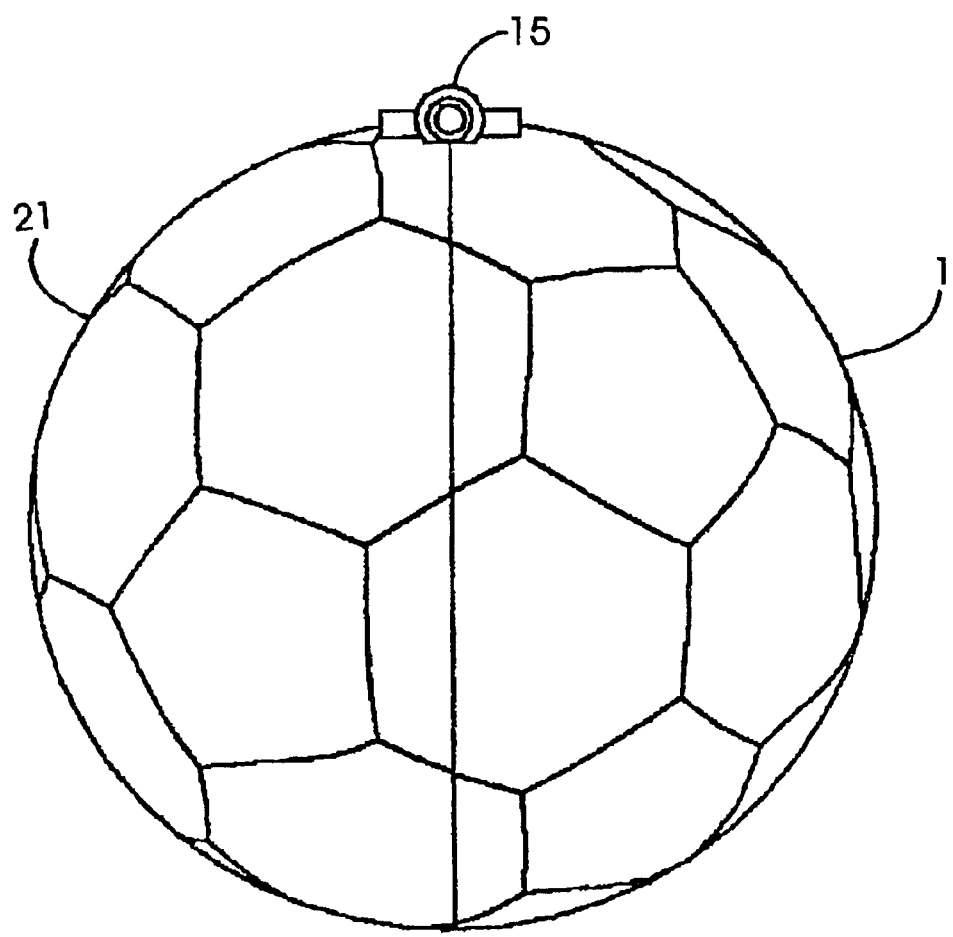
FIGS. 3 and 4 are illustrative of the outer appearances of the binoculars doubling as a toy when constructed according to the principles of the invention.
Figure 4:
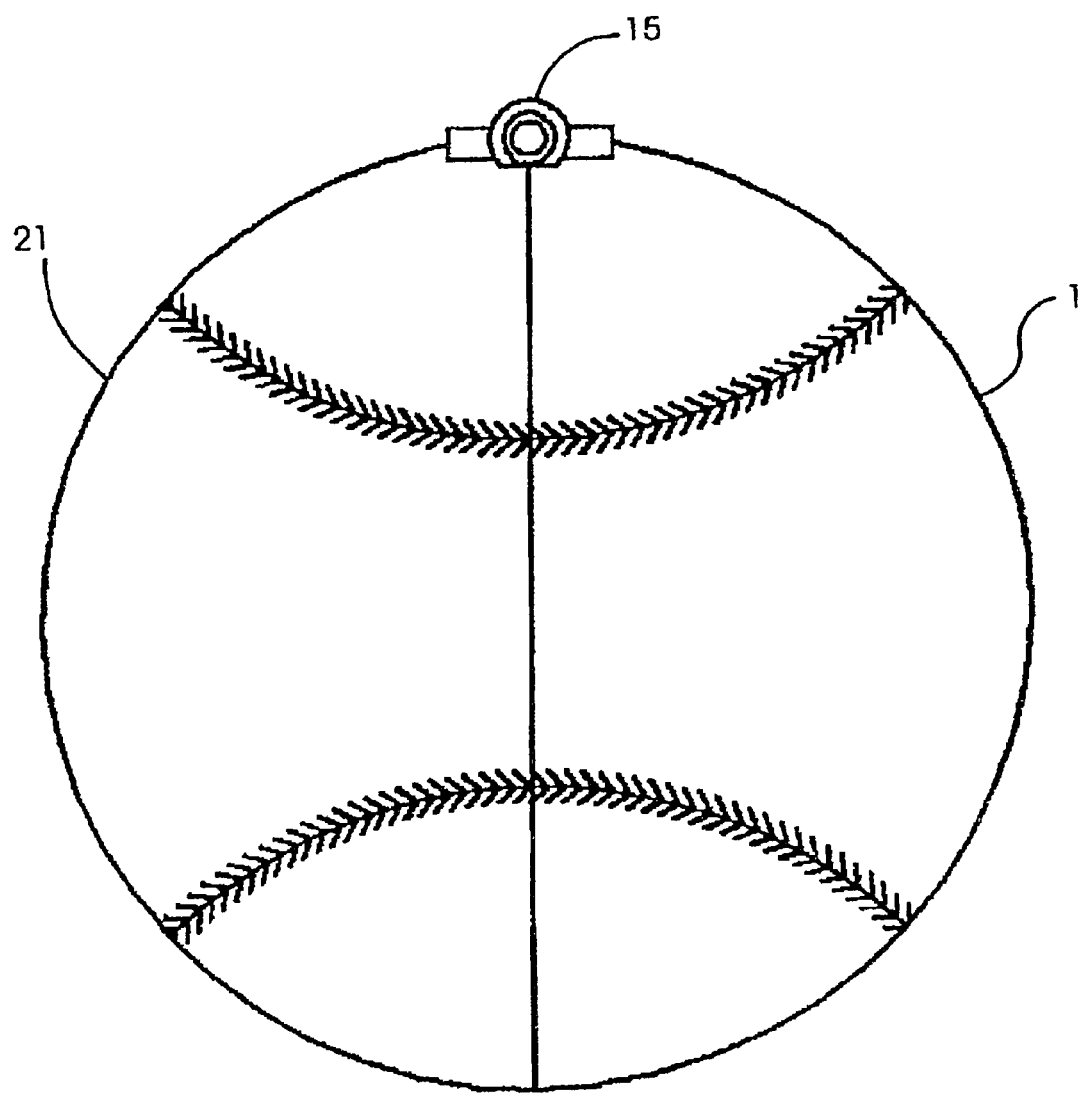

Binoculars doubling as a toy may be made with various shapes such as a soccer ball and baseball as shown in FIGS. 3 and 4 when the hemispherical bodies 1, 21 are closed and joined together.

Binoculars doubling as a toy of the invention constructed as above operate in the following manner. When body 21 is rotated about hinge 15 toward body 1 to open the binoculars, springs 13, 33 are released from their compressed position to eject objective lens barrels 10, 30 from their respective surrounding circular plates 7, 27. As the objective lens barrels 10, 30 are ejected as described above, the length between eye lenses 5, 25 and objective lenses 9, 29 is increased to enlarge the field of vision of an observer over a longer distance. At this time, the fitting projections 11, 31 of objective lens barrels 10, 30 are caught by flanges 12, 32 formed around the interior periphery of through holes in circular plates 7, 27.

Accordingly, when binoculars double as a toy according to the principles of the invention as set forth above, the binoculars are opened from their folded position, the objective lens barrels are ejected by the springs and thereby increase the length between the objective lenses 9, 29 and the eye lenses 5, 25 to prolong the field of vision of the observer up to a longer distance. The binoculars can be manufactured into a shape such as a soccer ball or baseball to conform to the games in which a user employs the binoculars to have an appropriate decorative appearance as well as provide excellent portability and convenient maintenance.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. Binoculars doubling as a toy, comprising:
    hemispherical bodies defining a complete global shape when coupled with each other, connected to each other by a hinge;
    eye lens barrels each having eye lenses and mounted to centers of arc sections of the bodies;
    circular plates mounted into grooves formed in the arc sections;
    objective lens barrels each having objective lenses and inserted into through holes of the circular plate; and
    springs each mounted between the eye lens barrels and the objective lens barrels, wherein said strings are compressed to allow a length between said objective lenses and said eve lenses to be decreased when said hemispherical bodies form the complete global shape, and said springs eject sail objective lens barrels to allow said objective lense barrels to protrude from said circular plate and to allow the length to be increased when said hinge allows said hemispherical bodies to rotate apart from said global shape.

2. The binoculars doubling as a toy according to claim 1, further comprising:
    fitting projections each formed in the objective lens barrels; and
    protrusions each formed around the through holes of the circular plates,
    wherein the fitting projections are respectively caught by the protrusions when the objective lens barrels are projected by the springs.

3. The binoculars of claim 1, further comprised of said bodies encasing said eye lens barrels, said circular plates, said objective lens barrels and said springs when said bodies rotate around said hinge to form said complete global shape.

4. Binoculars, comprising:
    a pair of complementary hemispherical bodies joined together by a hinge to form a spherical external shape;
    a pair of eye lens barrels positioned inside corresponding ones of said bodies;
    a pair of eye lenses mounted within corresponding ones of said eye lens barrels;
    a pair of circular plates diametrically spanning open bases of said corresponding ones of said eye lens barrels, with each of said plates being perforated by an aperture;
    a pair of objective lens barrels positioned inside said corresponding ones of said bodies, to reciprocatingly protrude through corresponding ones of said apertures whenever said hinge allows said bodies to rotate apart from said spherical shape;
    a pair of objective lenses mounted within corresponding ones of said objective lens barrels in optical alignment with corresponding ones of said eye lenses; and
    a pair of compressible springs disposed in partial compression between corresponding ones of said bodies and said objective lens barrels, wherein said pair of compressible springs are compressed to allow a length between said pair of objective lenses and said pair of eye lenses to be decreased when said binoculars form the spherical shape, and said pair of compressible springs eject said pair of objective lens barrels to allow said pair of objective lense barrels to protrude from said pair of circular plate and to allow the length to be increased when said bodies rotate apart from said spherical shape.

5. The binoculars of claim 4, further comprised of:
    a first flange disposed around an exterior of each of said objective lens barrels to engage a first end of a corresponding one of laid springs; and
    a second flange positioned within an interior of each of said bodies to engage a second and axially opposite end of said corresponding one of said springs.

6. The binoculars of claim 4, further comprised of said hinge enabling said bodies to lie within a common diametric plane when an opened state.

7. The binoculars of claim 4, further comprised of said bodies being symmetrically disposed around said hinge while said shape is in an opened state.

8. The binoculars of claim 4, further comprised of said shape having an exterior surface replicating the appearance of an athletic ball.

9. The binoculars of claim 4, further comprised of said bodies encasing said pair of eye lens barrels, said pair of circular plates, said pair of objective lens barrels, said pair of objective lenses and said pair of compressible springs when said bodies join together to form said spherical external shape.

10. The binoculars of claim 4, further comprised of:
    said pair of objective lens barrels traveling through said apertures together, and moving said pair of objective lenses farther apart from said pair of eye lenses, when said bodies rotate about said hinge from a state of being joined together.

11. Binoculars, comprising:
    a pair of geometrically complementary bodies rotatably joined together at their peripheries by a hinge to mate and form a complete symmetrical shape while in a closed state, and to form symmetrical parts of said shape exposing open bases of said parts leading into concave interiors of said bodies while in an opened state;
    a first pair of barrels positioned along different optical axes within corresponding ones of said bodies;
    a pair of eye lenses mounted along corresponding ones of said axes within corresponding ones of said bodies;
    a second pair of barrels each positioned along a different one of said axes;

a pair of transverse members each holding a different one of said second pair of barrels within different corresponding ones of said interiors, with at least one of said second pair of barrels freely reciprocate relative to a corresponding one of said pair of eye lens along a corresponding one of said axes to protrude through a corresponding one of said bases as said bodies assume said opened state;

a pair of objective lenses mounted within corresponding ones of said second barrels in optical alignment with corresponding ones of said eye lenses; and a pair compressible springs maintained by said transverse members in partial compression between corresponding ones of said bodies and said second barrels.

12. The binoculars of claim 11, further comprised of:

a first flange disposed on an exterior of each of said second barrels to engage a first end of a corresponding one of said springs; and a second flange positioned within an interior of each of said bodies to engage a second and axially opposite end of said corresponding one of said springs.

13. The binoculars of claim 12, further comprised of:

said second pair of barrels traveling through apertures in said transverse members together, and moving said pair of objective lenses farther apart from said pair of eye lenses, when said bodies rotate about said hinge from a state of being joined together.

14. The binoculars of claim 11, further comprised of said hinge enabling said parts to position said bases within a common diametric plane while said shape is in said opened state.

15. The binoculars of claim 14, further comprised of:

said second pair of barrels traveling through apertures in said transverse members together, and moving said pair of objective lenses farther apart from said pair of eye lenses, when said bodies rotate about said hinge from a state of being joined together.

16. The binoculars of claim 11, further comprised of said parts being symmetrically disposed around said hinge while said shape is in said opened state.

17. The binoculars of claim 16, further comprised of:

said second pair of barrels traveling through apertures in said transverse members together, and moving said pair of objective lenses farther apart from said pair of eye lenses, when said bodies rotate about said hinge from a state of being joined together.

18. The binoculars of claim 11, further comprised of said shape having an exterior surface replicating the appearance of an athletic ball.

19. The binoculars of claim 11, further comprised of said bodies enclosing said first pair of barrels, said second pair of barrels, said transverse members, said pair of objective lenses and said pair of springs while said bodies are in said closed state.

20. The binoculars of claim 11, further comprised of:

said second pair of barrels traveling along corresponding ones of said axes and moving said pair of objective lenses farther apart from said pair of eye lenses as said bodies rotate about said hinge from said closed state to assume said open state.

* * * * *